United States Patent
Hwang et al.

(10) Patent No.: US 12,219,444 B2
(45) Date of Patent: Feb. 4, 2025

(54) METHOD FOR CONTROLLING VEHICLE DRIVING BY FIRST DEVICE IN WIRELESS COMMUNICATION SYSTEM SUPPORTING SIDELINK, AND DEVICE THEREFOR

(71) Applicant: LG ELECTRONICS INC., Seoul (KR)

(72) Inventors: Jaeho Hwang, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 17/794,918

(22) PCT Filed: Jan. 25, 2021

(86) PCT No.: PCT/KR2021/000984
§ 371 (c)(1),
(2) Date: Jul. 22, 2022

(87) PCT Pub. No.: WO2021/150087
PCT Pub. Date: Jul. 29, 2021

(65) Prior Publication Data
US 2023/0353993 A1      Nov. 2, 2023

(30) Foreign Application Priority Data
Jan. 23, 2020   (KR) .................. 10-2020-0009308

(51) Int. Cl.
*H04W 72/04*   (2023.01)
*G08G 1/00*    (2006.01)
(Continued)

(52) U.S. Cl.
CPC ............... *H04W 4/40* (2018.02); *G08G 1/22* (2013.01); *H04W 72/40* (2023.01)

(58) Field of Classification Search
None
See application file for complete search history.

(56) References Cited

U.S. PATENT DOCUMENTS

2018/0249444 A1\*  8/2018 Sorrentino ............ H04W 24/08
2019/0206236 A1   7/2019 Tao et al.
(Continued)

FOREIGN PATENT DOCUMENTS

JP    2015014970    1/2015
KR   1020150084112  7/2015
(Continued)

OTHER PUBLICATIONS

PCT International Application No. PCT/KR2021/000984, International Search Report dated May 26, 2021, 3 pages.

*Primary Examiner* — Sai Aung
(74) *Attorney, Agent, or Firm* — LEE, HONG, DEGERMAN, KANG & WAIMEY

(57) ABSTRACT

According to various embodiments, disclosed are a method for controlling vehicle driving at a particular interval by a first device in a wireless communication system supporting a sidelink, and a device therefor. Disclosed are the method and the device for the method, the method comprising the steps of: transmitting a first signal requesting standby for entrance to the particular interval; receiving a second signal in response to the first signal from each of multiple vehicles; and transmitting, on the basis of the second signal, a third signal for instructing entrance to the particular interval, wherein the first device groups vehicles, which have been on standby for entrance for a first threshold time or more, among the multiple vehicles, into a first group, on the basis of information on an entrance standby time point according to the first signal included in the second signal, and the third signal is transmitted to the first group on the basis of whether (Continued)

a group size of the first group is equal to or larger than a first threshold size and whether group information is received from a second device.

11 Claims, 24 Drawing Sheets

(51) Int. Cl.
*H04W 4/40* (2018.01)
*H04W 72/40* (2023.01)

(56) References Cited

U.S. PATENT DOCUMENTS

| | | | |
|---|---|---|---|
| 2020/0137769 A1* | 4/2020 | Sun | H04L 5/0037 |
| 2020/0221423 A1* | 7/2020 | Wang | H04W 72/02 |
| 2020/0343951 A1* | 10/2020 | Hou | H04B 7/0617 |
| 2020/0413397 A1* | 12/2020 | Blasco Serrano | H04L 1/1812 |
| 2021/0409990 A1* | 12/2021 | Wang | H04W 24/08 |
| 2022/0022277 A1* | 1/2022 | Zhao | H04L 1/1812 |
| 2022/0045800 A1* | 2/2022 | Chen | H04L 1/1896 |

FOREIGN PATENT DOCUMENTS

| | | |
|---|---|---|
| KR | 101615970 | 4/2016 |
| KR | 1020190104012 | 9/2019 |

* cited by examiner (a)

(b)

(a)

(b)

METHOD FOR CONTROLLING VEHICLE DRIVING BY FIRST DEVICE IN WIRELESS COMMUNICATION SYSTEM SUPPORTING SIDELINK, AND DEVICE THEREFOR

CROSS-REFERENCE TO RELATED APPLICATIONS

This application is the National Stage filing under 35 U.S.C. 371 of International Application No. PCT/KR2021/000984, filed on Jan. 25, 2021, which claims the benefit of earlier filing date and right of priority to Korean Application No. 10-2020-0009308, filed on Jan. 23, 2020, the contents of which are all hereby incorporated by reference herein their entirety.

TECHNICAL FIELD

The present disclosure relates to a method of controlling, by a first device, driving of vehicles in a specific section in a wireless communication system supporting sidelink and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

The object of the present disclosure is to provide a method of performing grouping based on the waiting time of each vehicle according to a waiting instruction, guaranteeing smooth vehicle traffic in a road control section for each group and each direction, and adjusting the group size of each group appropriately in order to provide equal driving opportunities for each direction and device therefor.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

In an aspect of the present disclosure, there is provided a method of controlling, by a first device, driving of vehicles in a specific section in a wireless communication system supporting sidelink. The method may include: transmitting a first signal requesting to wait for entry into the specific section; receiving a second signal from each of a plurality of vehicles in response to the first signal; and transmitting a third signal indicating the entry into the specific section based on the second signal. The first device may group vehicles waiting to enter for more than a first threshold time among the plurality of vehicles into a first group based on information on an entry waiting time according to the first signal included in the second signal. The third signal may be transmitted to the first group depending on whether a group size of the first group is greater than or equal to a first threshold size and whether group information is received from a second device.

Alternatively, the third signal may be transmitted to the first group based on formation of the first group having a group size greater than or equal to the first threshold size without the reception of the group information.

Alternatively, before transmitting the third signal, the first device may transmit group information on the first group to the second device to prevent other groups from entering the specific section.

Alternatively, when the group information is received, the third signal may be transmitted to the first group having a group size greater than or equal to the first threshold size only if all vehicles corresponding to the group information depart from the specific section.

Alternatively, when the group information is received, the first group may be reconfigured based on a time at which all vehicles corresponding to the group information depart from the specific section.

Alternatively, a size of the reconfigured first group may be limited to a second threshold size.

Alternatively, the second signal may further include ratio information on a ratio of vehicles performing vehicle-to-everything (V2X) communication to the vehicles.

Alternatively, the second signal may further include ratio information on a ratio of vehicles performing V2X communication to the vehicles.

Alternatively, the first threshold size may be adjusted based on the ratio information.

In another aspect of the present disclosure, there is provided a first device configured to control driving of vehicles in a specific section in a wireless communication system supporting sidelink. The first device may include: a radio frequency (RF) transceiver; and a processor connected to the RF transceiver. The processor may be configured to: control the RF transceiver to transmit a first signal requesting to wait for entry into the specific section; receive a second signal from each of a plurality of vehicles in response to the first signal; group vehicles waiting to enter for more than a first threshold time among the plurality of vehicles into a first group based on information on an entry waiting time according to the first signal included in the second signal; and control the RF transceiver to transmit a third signal indicating the entry into the specific section based on the second signal. The third signal may be transmitted to the first group depending on whether a group size of the first group is greater than or equal to a first threshold size and whether group information is received from a second device.

Alternatively, the third signal may be transmitted to the first group based on formation of the first group having a group size greater than or equal to the first threshold size without the reception of the group information.

Alternatively, the second signal may further include ratio information on a ratio of vehicles performing V2X communication to the vehicles.

Alternatively, the first threshold size may be adjusted based on the ratio information.

In another aspect of the present disclosure, there is provided a chipset configured to control driving of vehicles in a specific section in a wireless communication system supporting sidelink. The chipset may include: at least one processor; and at least one memory operably connected to the at least one processor and configured to, when executed, cause the at least one processor to perform operations. The operations may include: transmitting a first signal requesting to wait for entry into the specific section; receiving a second signal from each of a plurality of vehicles in response to the first signal; grouping vehicles waiting to enter for more than a first threshold time among the plurality of vehicles into a first group based on information on an entry waiting time according to the first signal included in the second signal; and transmitting a third signal indicating the entry into the specific section based on the second signal. The third signal may be transmitted to the first group depending on whether a group size of the first group is greater than or equal to a first threshold size and whether group information is received from a second device.

Alternatively, the processor may be configured to control a driving mode of a device connected to the chipset based on the first threshold time.

In a further aspect of the present disclosure, there is provided a computer-readable storage medium having at least one computer program configured to cause at least one processor to perform operations of controlling driving of vehicles in a specific section in a wireless communication system supporting sidelink. The computer-readable storage medium may include: the at least one computer program configured to cause the at least one processor to perform the operations of controlling the driving of the vehicles in the specific section; and the computer-readable storage medium. The operations may include: transmitting a first signal requesting to wait for entry into the specific section; receiving a second signal from each of a plurality of vehicles in response to the first signal; grouping vehicles waiting to enter for more than a first threshold time among the plurality of vehicles into a first group based on information on an entry waiting time according to the first signal included in the second signal; and transmitting a third signal indicating the entry into the specific section based on the second signal. The third signal may be transmitted to the first group depending on whether a group size of the first group is greater than or equal to a first threshold size and whether group information is received from a second device.

Advantageous Effects

According to various embodiments of the present disclosure, grouping may be performed based on the waiting time of each vehicle according to a waiting instruction, smooth vehicle traffic in a road control section may be ensured for each group and each direction, and the group size of each group may be adjusted appropriately, thereby providing equal driving opportunities for each direction.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
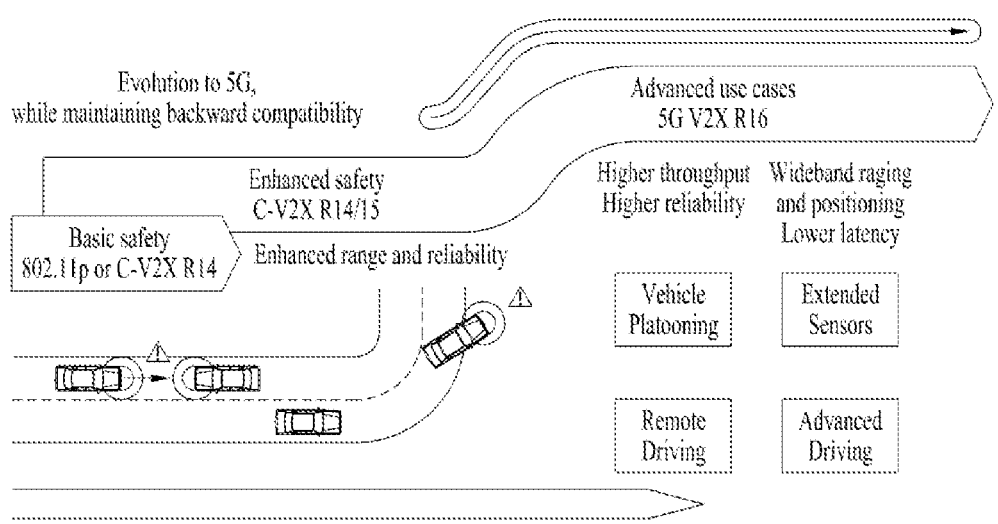
FIG. 1 is a diagram for explaining by comparing vehicle-to-everything (V2X) communication based on radio access technology (RAT) before new radio (NR) and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
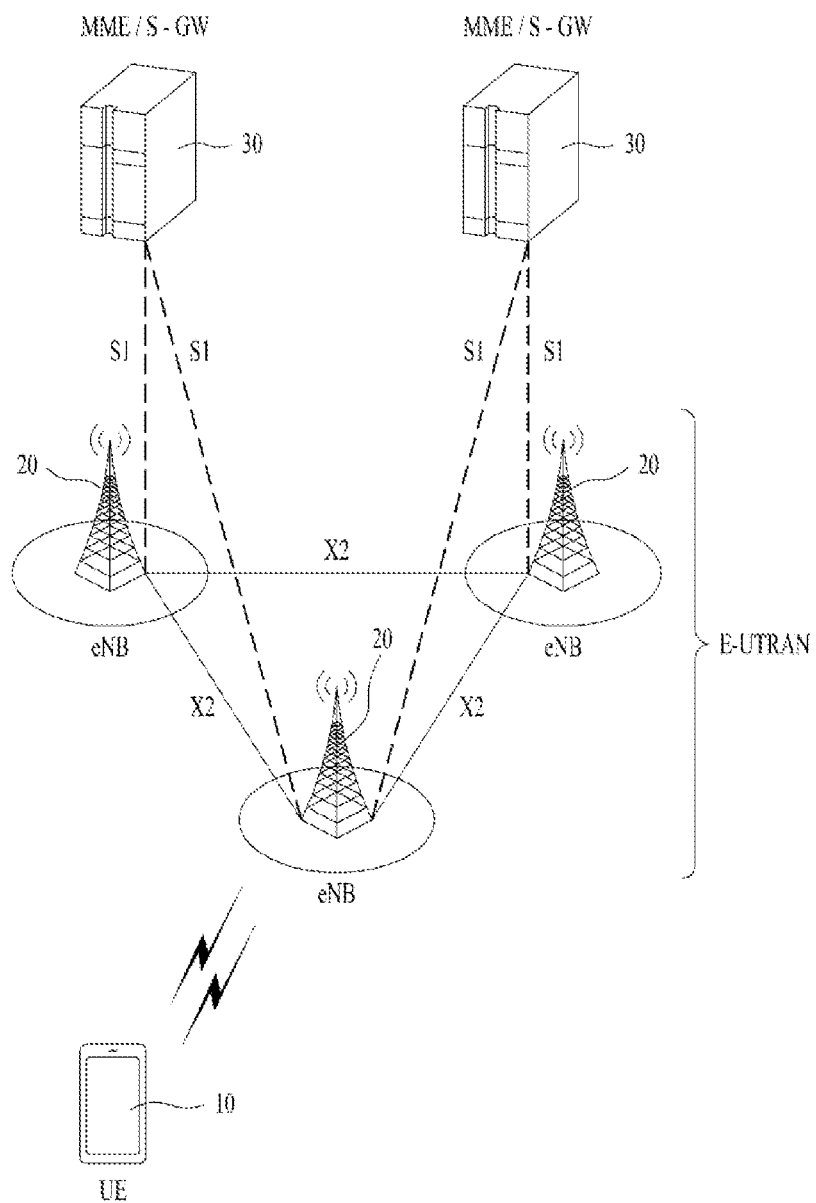
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
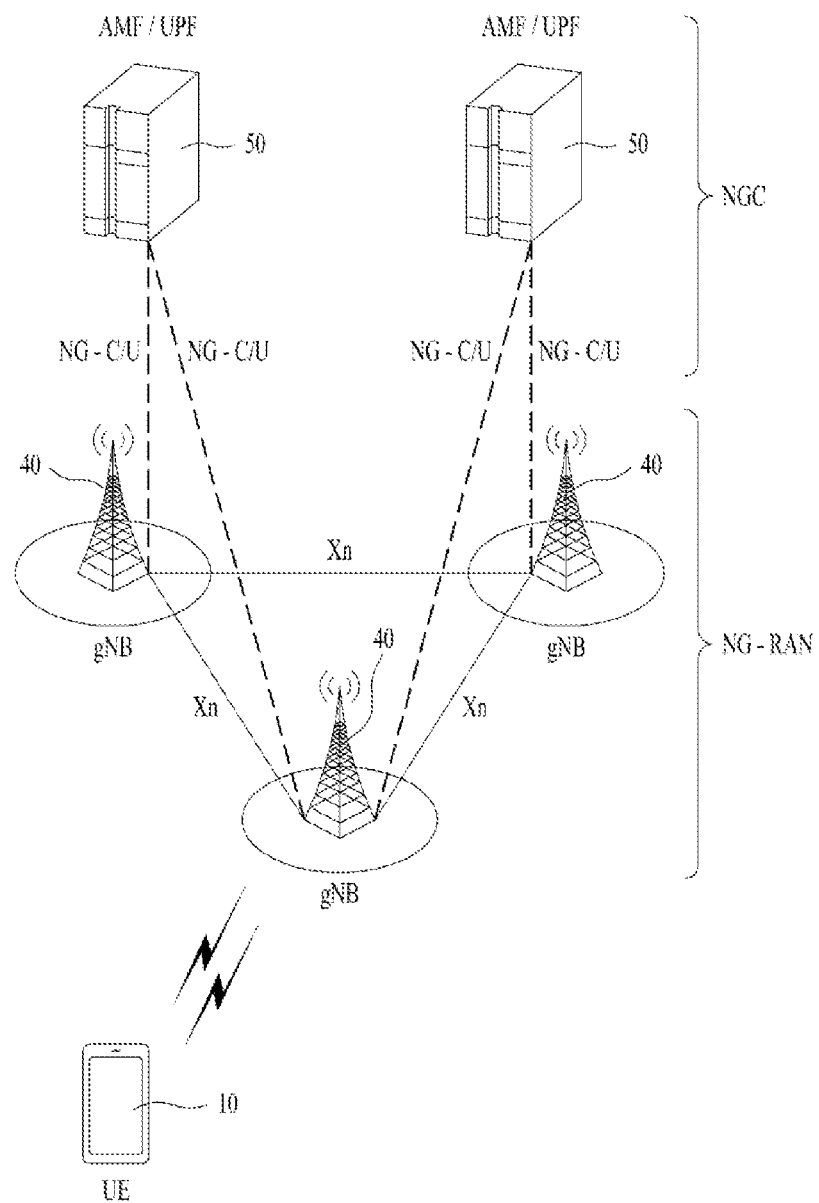
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
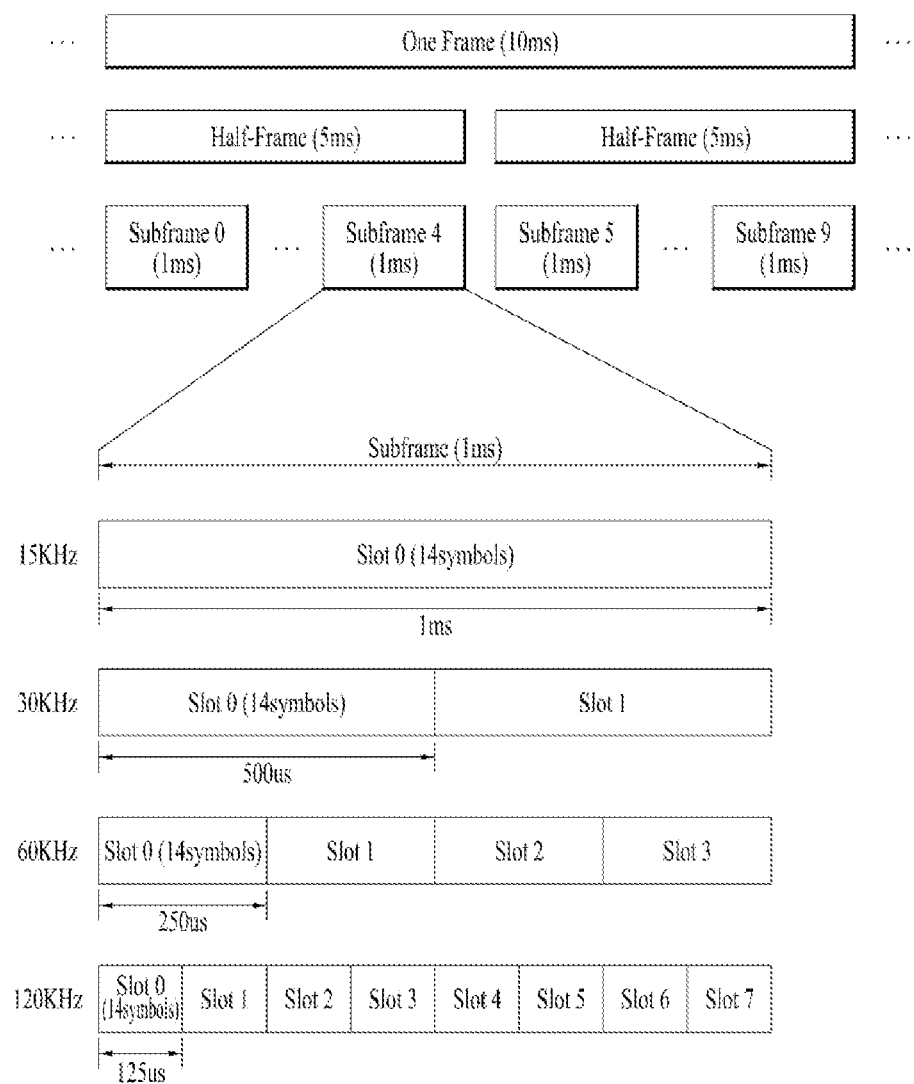
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6

GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
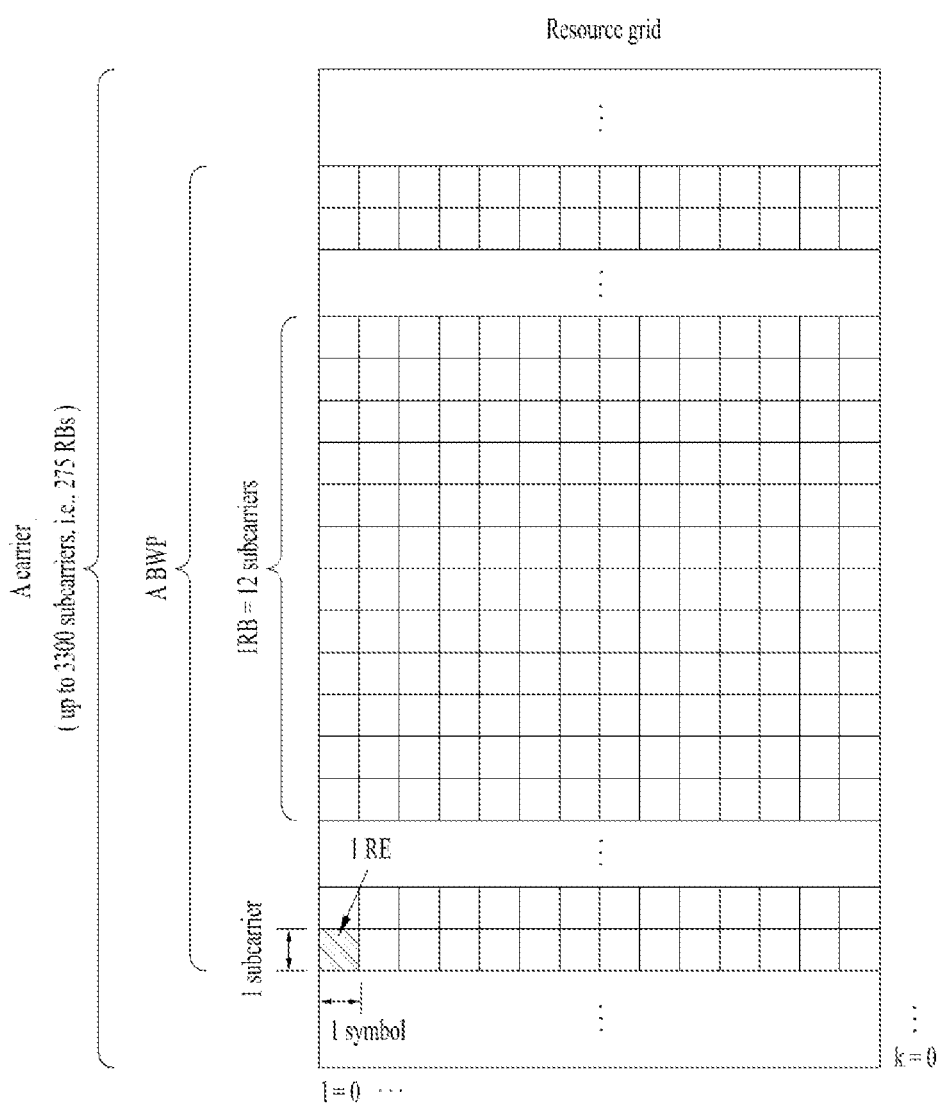
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
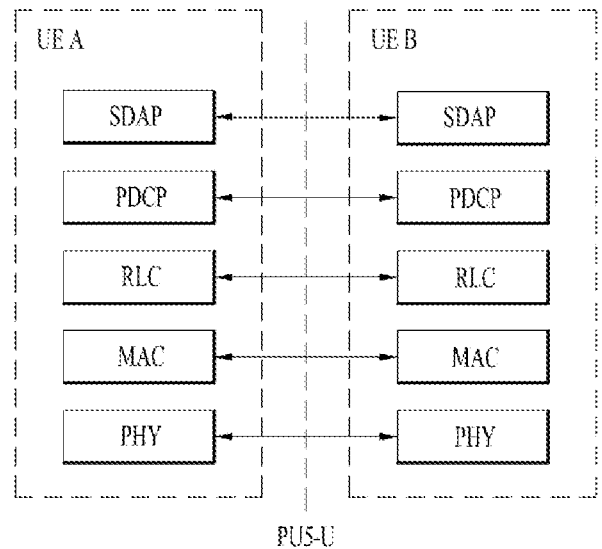
FIG. 6 illustrates a radio protocol architecture for SL communication.
Figure 6:
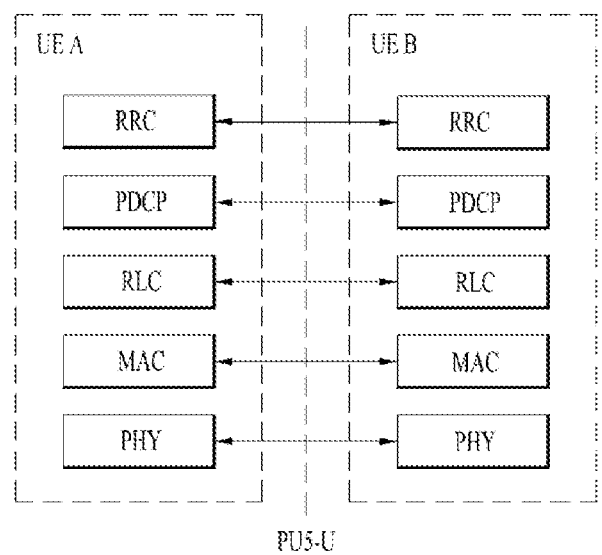

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
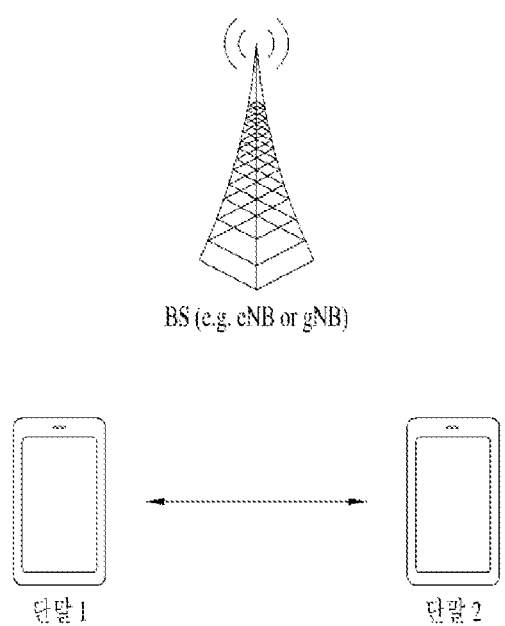
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
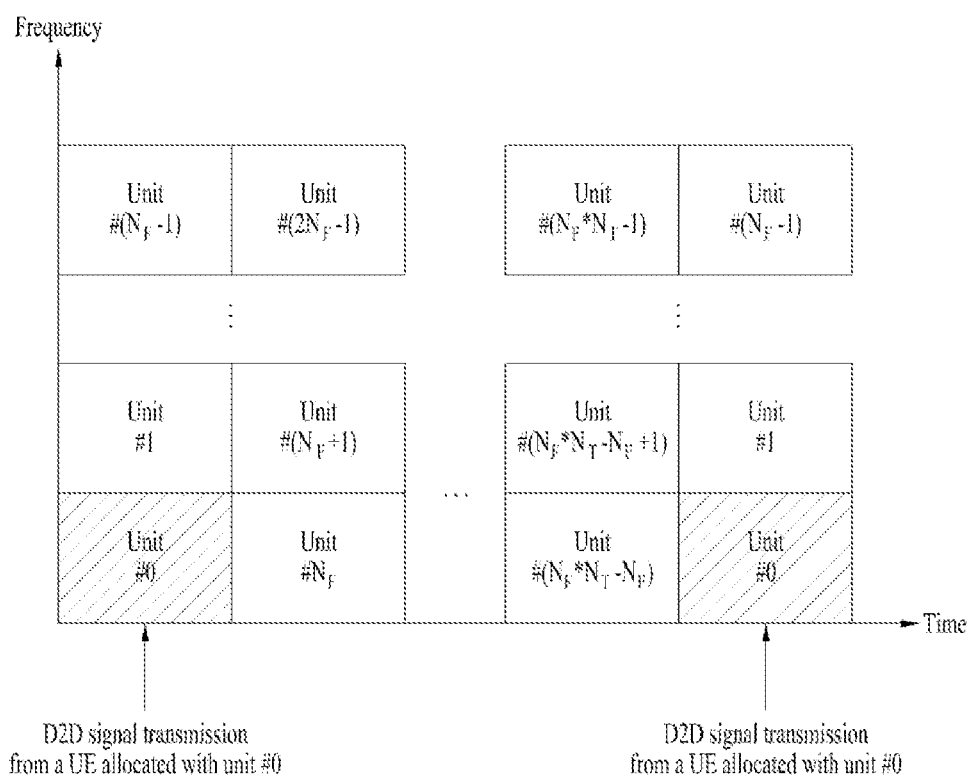
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
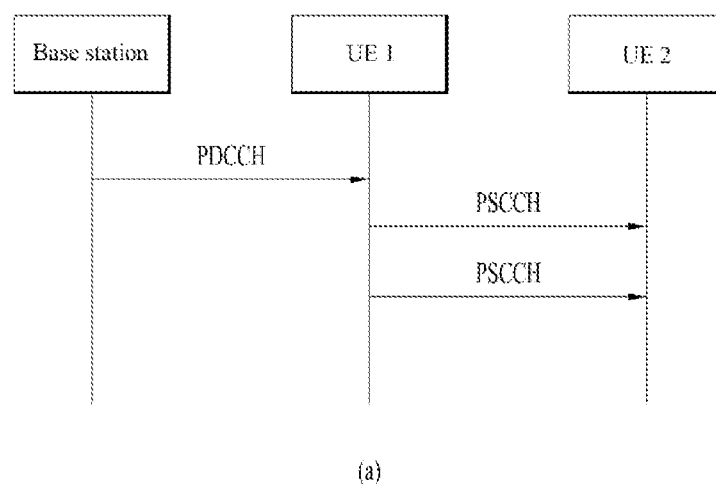
FIG. 9 illustrates a procedure in which UEs perform V2X or SL communication according to a transmission mode.
Figure 9:
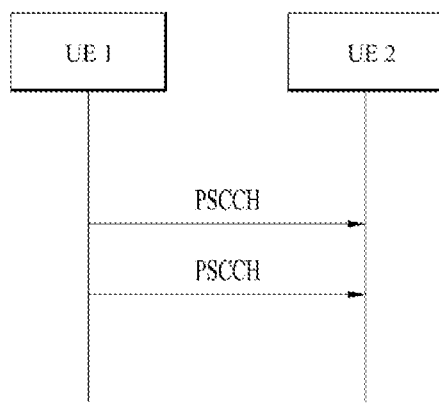

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

Generally, for the purpose of overcoming the pathloss problem when using a very high frequency such as mmWave, beamforming may be used. In order to use such beamforming, the best beam pair should be detected from among several beam pairs between a transmitter and a receiver. From the viewpoint of the receiver, the above-mentioned process may be referred to as a beam acquisition process or a beam tracking process. In particular, since analog beamforming is used in mmWave, the vehicle needs to perform beam sweeping that performs beam switching in different directions at different time points using an antenna array of the vehicle in the beam acquisition or beam tracking process.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 10:
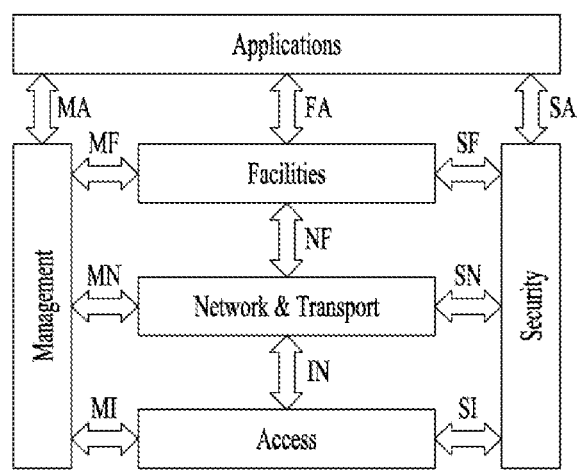
FIG. 10 is a diagram for explaining an ITS station reference architecture.

FIG. 10 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Figure 11:
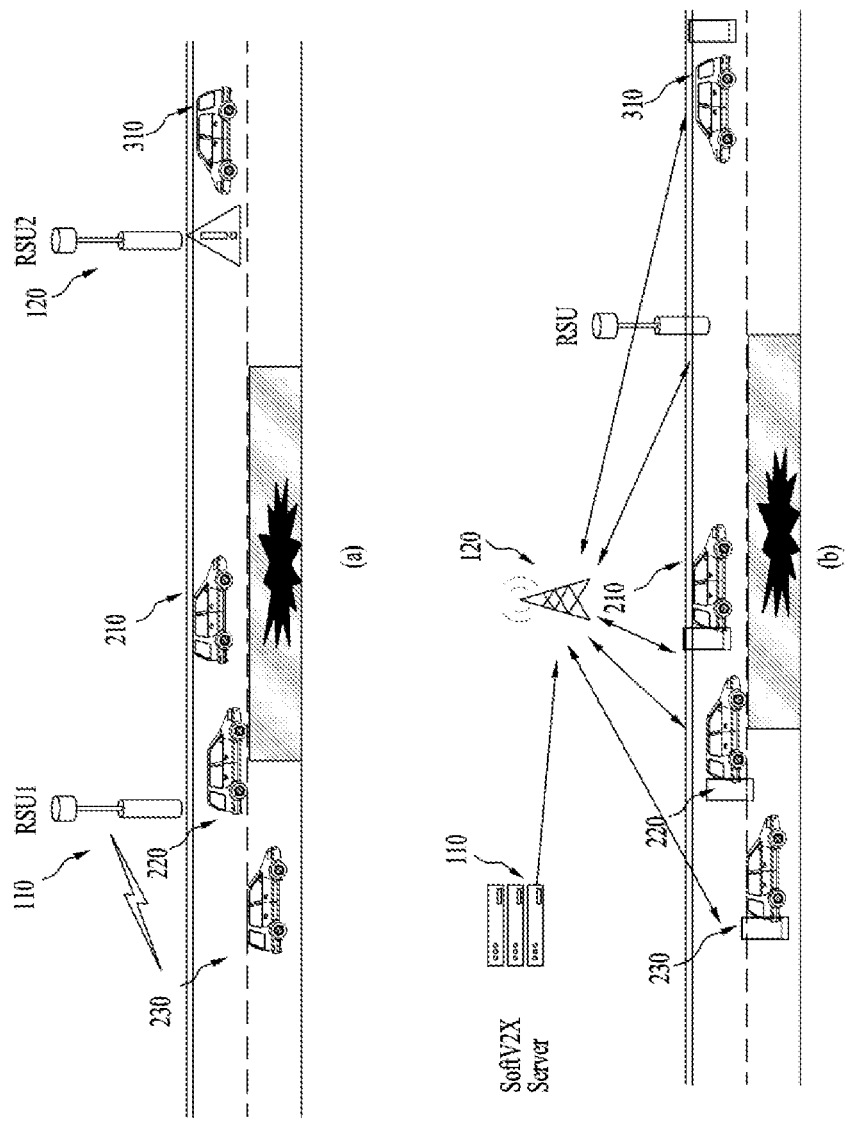
FIG. 11 is a diagram for explaining a method of controlling the flow of vehicles when there is a restriction on one of two lanes in opposite directions.

Specifically, features of the ITS station reference architecture based on the OSI model are illustrated in FIG. 11. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer
MF: Interface between management entity and facilities layer
MN: Interface between management entity and networking & transport layer
MI: Interface between management entity and access layer
FA: Interface between facilities layer and ITS-S applications
NF: Interface between networking & transport layer and facilities layer
IN: Interface between access layer and networking & transport layer
SA: Interface between security entity and ITS-S applications
SF: Interface between security entity and facilities layer
SN: Interface between security entity and networking & transport layer
SI: Interface between security entity and access layer A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls and ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

Group and Flow Control Based on Interactive V2X in NR V2X

FIG. 11 is a diagram for explaining a method of controlling the flow of vehicles when there is a restriction on one of two lanes in opposite directions.

When lanes are restricted, such as under construction or special circumstances, the flow of vehicles may be controlled by temporary traffic lights or by construction workers by radio. When a temporary traffic light is used, vehicles may be controlled regardless of the vehicle traffic flow at both ends. In addition, if a vehicle is allowed to pass the temporary traffic light while another vehicle is passing the traffic light in the other direction, there is risk of collisions between the vehicles. In general, in order to prevent such collisions between vehicles, the period of a traffic signal may be set longer than the travel time of a vehicle in one direction. As a result, the traffic flow may be significantly degraded due to the period of such a communication signal.

Therefore, there is need for a communication system that allows interactive communication between an RSU and a vehicle (interactive V2X communication) in a road control section where a lane in one direction is restricted.

Referring to FIG. 11(a), among lanes in both directions (e.g., a first direction and a second direction), one lane in either direction (e.g., first direction) may be restricted by situations such as construction. In this case, the flow of vehicles in each lane needs to be controlled sequentially for each direction. Each of a first RSU 110 and a second RSU 120 may control the flow of vehicles in one of the two directions. Each of the first RSU 110 and the second RSU 120 may perform interactive communication (interactive V2X) with surrounding vehicles on the lane in the corresponding direction. In addition, the first RSU 110 and the second RSU 120 may perform I2I communication with each other and exchange information on vehicle flow control with each other.

In other words, the first RSU 110 may control the flow of vehicles 210, 220, and 230 entering a road control section in the first direction, and the second RSU 120 may control the flow of a vehicle 310 entering the road control section in the second direction. In addition, when the first RSU 110 permits the vehicles 210, 220, and 230 to enter the road control section (i.e., drive in the reverse direction), the first RSU 110 may inform the second RSU 120 that the vehicles 210, 220, and 230 enters the road control section, and the second RSU 120 may stop the vehicle 310 traveling in the second direction. After the last vehicle 230 passes the road control section, the second RSU 120 may change the signal to allow the vehicle 310 to enter the road control section.

To establish such a communication system, each of the first RSU 110 and the second RSU 120 needs to perform interactive communication with surrounding vehicles. That is, protocols and messages for I2I communication may be required between the first RSU 110 and the second RSU 120. The present disclosure proposes an algorithm for an RSU to recognize surrounding vehicles and an algorithm for an RSU to control the flow of vehicles. In addition, the present disclosure proposes interactive I2I communication protocols enabling communication between RSUs in real time and interactive I2V communication protocols enabling communication between an RSU and vehicles in real time. In addition, a case in which two RSUs are within each other's coverage and a case in which two RSUs are outside of each other's coverage will be described.

Referring to FIG. 11(b), a BS or network supporting soft V2X communication may be configured on behalf of one of the two RSUs. An RSU 410 may control the vehicle flow by communicating with vehicles entering the road control section in the first direction, and a soft V2X server (or BS) may control the vehicle flow based on soft V2X communication with vehicles entering the road control section in the second direction. In this case, the RSU 410 may control the flow of vehicles based on soft V2X communication through the soft V2X server without exchanging information with other RSUs.

Figure 12:
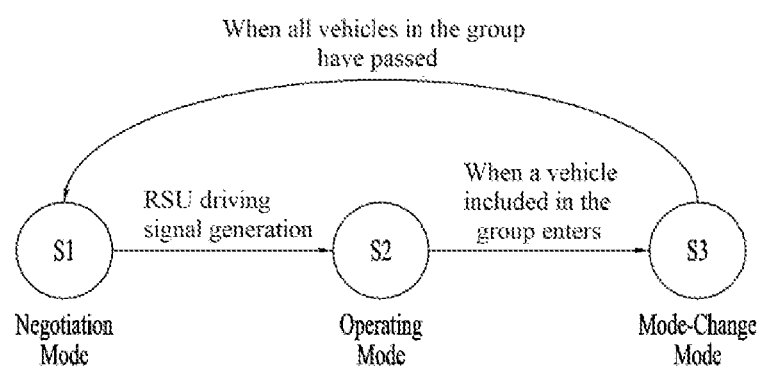
FIG. 12 is a diagram for explaining steps for a road side unit (RSU) to control driving of vehicles.

FIG. 12 is a diagram for explaining steps for an RSU to control driving of vehicles.

Referring to FIG. 12, the RSU may control the flow of vehicles through a negotiation step (S1), an operation step (S2), and a mode change step (S3).

In the negotiation step (S1), the RSU may inform vehicles entering a road control section on a lane in a specific direction of a road restriction, receive vehicle status information from each vehicle, and perform grouping on the vehicles based on a traffic flow control device (or traffic flow control algorithm) or a flow control device. In other words, in the negotiation step, the RSU may stop vehicles approaching the road control section in the specific direction, perform grouping on the stopped vehicles, and then determine whether to form a group allowed to enter the road control section based on the grouping.

In the operation step (S2), the RSU may start vehicles in a group (or group A1) selected by the RSU (or RSU 1) and stop vehicles in the remaining groups (or group A2). In addition, the RSU (or RSU 1) may transmit information about the vehicles in the group allowed to enter (or information on group A1) and information on the departure status thereof to another RSU (or RSU 2).

In the mode change step S3, the RSU may detect or determine whether the vehicles entering the road control section leave the road control section based on information on a specific group received from the other RSU. In other words, when the RSU receives group information from the other RSU in the negotiation step, the RSU performs the mode change step. In the mode change step, the RSU may collect vehicle information from vehicles included in the specific group. The RSU may collect the vehicle information by periodically obtaining a vehicle position included in a conventional V2X message (e.g., CAM or BSM) or requesting information about the vehicle position from each of the vehicles included in the specific group. The RSU may proceed with the operation and/or negotiation step when it is confirmed that all vehicles included in the specific group leave the road control section.

Figure 13:
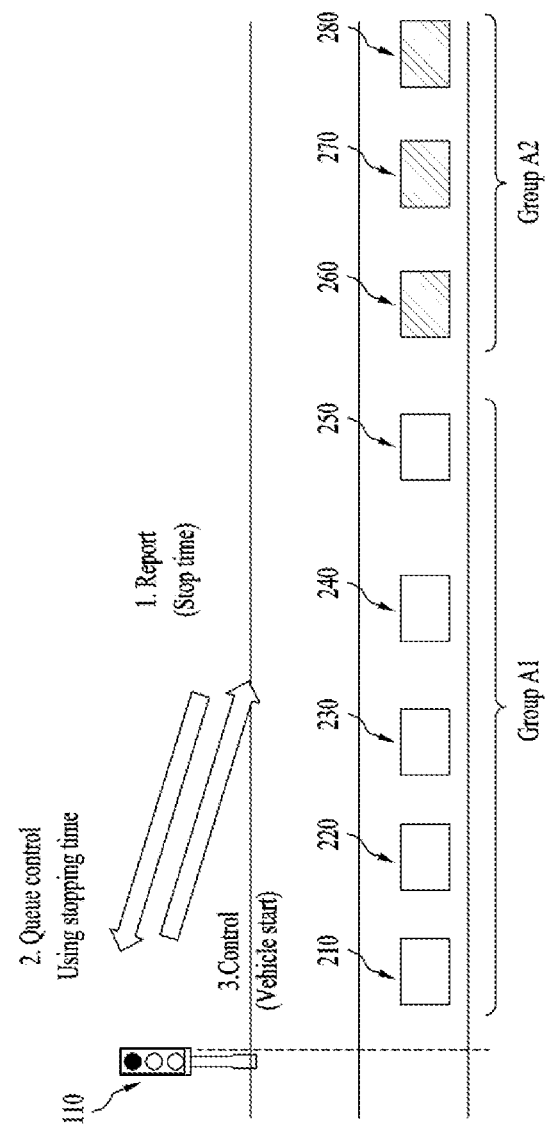
FIGS. 13 and 14 are diagrams for explaining a method for an RSU to group surrounding vehicles.
Figure 14:
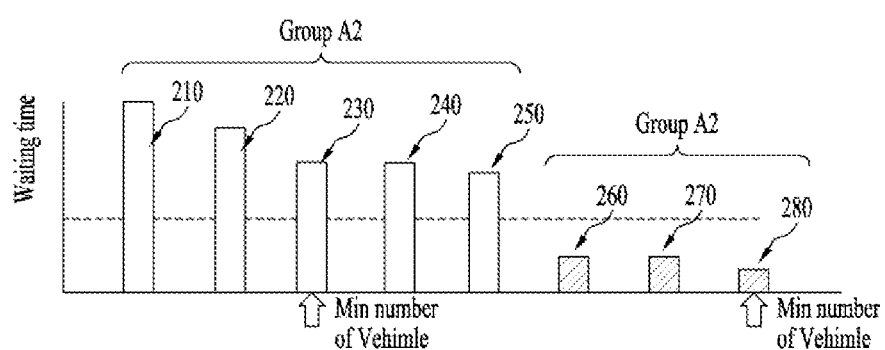

FIGS. 13 and 14 are diagrams for explaining a method for an RSU to group surrounding vehicles.

Referring to FIG. 13, an RSU 110 may group a plurality of vehicles 210, 220, 230, 240, 250, 260, 270, and 280 in the negotiation step to control the vehicle flow for each group.

Specifically, the RSU 110 may transmit a first signal including information on road conditions such as a road control section and information for requesting to stop to the plurality of vehicles 210, 220, 230, 240, 250, 260, 270, and 280. The RSU 110 may receive a second signal including information on a stopping time (i.e., waiting time based on the first signal) from each of the plurality of vehicles 210, 220, 230, 240, 250, 260, 270, and 280. The RSU 110 may group the plurality of vehicles 210, 220, 230, 240, 250, 260, 270, and 280 into at least one group based on the information on the stopping time. According to the grouping results, the RSU 110 may form a group to which the RSU transmits a third signal permitting the entry into the road control section and control the flow of vehicles in the road control section for each formed group. For example, the RSU 110 may group the vehicles 210, 220, 230, 240, and 250 into group A1 and the vehicles 260, 270, and 280 into group A2 based on the information on the stopping time.

Referring to FIG. 14, the RSU 110 may calculate the waiting time of each of the plurality of vehicles based on the stopping time reported from each of the plurality of vehicles. In this case, the RSU 110 may group vehicles each having a waiting time greater than or equal to a predetermined threshold time into group A1 and group vehicles each having a waiting time less than the specific threshold time into group A2. When the number of vehicles included in group A1 is greater than or equal to a predetermined minimum group size, the RSU 110 may transmit the third signal to allow group A1 to drive.

On the other hand, if the RSU 110 switches to the above-described mode change step (S3) before the group size of group A1 becomes greater than or equal to a first threshold size, the RSU 110 may recalculate the waiting time of each of the plurality of vehicles based on a time at which the mode change step S3 ends. Based on the recalculated waiting time, the RSU 110 may transmit the third signal to group A1 including vehicles that wait for a long time so that the vehicles may first pass the road control section.

In this case, even if the number of vehicles that wait for more than the specific threshold time among the plurality of vehicles increases due to a delay caused by the mode change step, the RSU 110 may include vehicles such that the group size of group A1 does not exceed a maximum group size. In other words, even if the group size of group A1 increases due to the mode change step, the group size of group A1 may be limited to be less than or equal to the predetermined maximum group size. By doing so, even if the waiting time increases, the maximum number of vehicles allowed to pass may be limited, thereby giving fair driving opportunities to vehicles in different directions.

Alternatively, when vehicles drive smoothly, the RSU 110 may configure group A1 with the predetermined minimum number of vehicles (or minimum group size). In this case, the delay caused by the mode change step may be minimized. For a middle case, vehicles each having a waiting time greater than or equal to the predetermined threshold time (or first threshold time) may be classified into group A1, and vehicles each having a waiting time less than the predetermined threshold time (or first threshold time) may be classified into group A2. When the number of groups is adjusted based on the waiting time as described above, the travel time may be adjusted appropriately depending on different vehicle congestion levels on both access of the construction site (or road control section).

Figure 15:
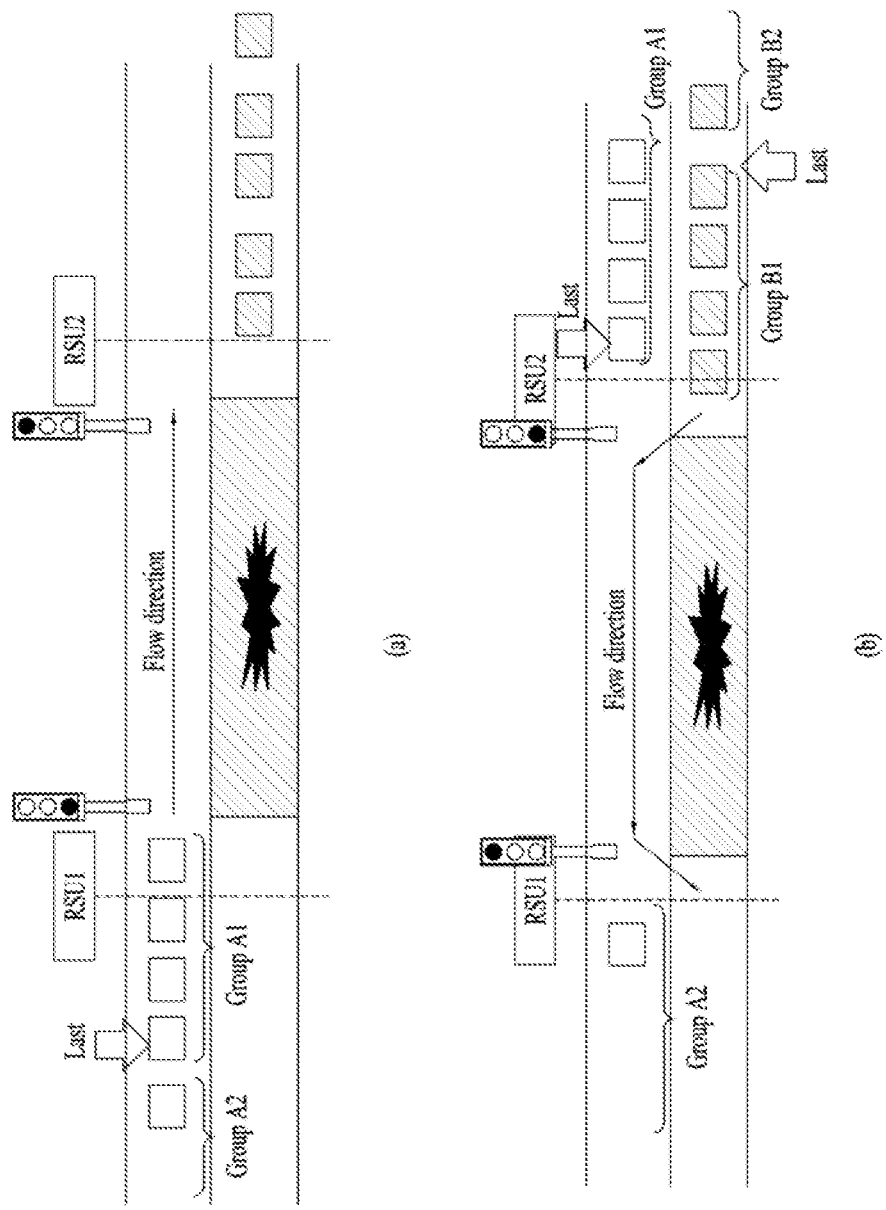
FIG. 15 is a diagram for explaining a method for a first RSU to control driving of vehicles based on grouping results.

FIG. 15 is a diagram for explaining a method for a first RSU to control driving of vehicles based on grouping results.

Referring to FIG. 15(a), the first RSU (RSU 1) may transmit a driving instruction signal to group A1 in the operation step. In this case, the first RSU (RSU 1) may transmit a stop instruction signal to group A2 or maintain the stationary state of group A2. In addition, the first RSU (RSU 1) may transmit a signal including information on the departure status of group A1 and group information on group A1 to a second RSU (RSU 2).

Referring to FIG. 15(b), the second RSU (RSU 2) may receive the signal including the information on the departure status of group A1 and the group information on the group A1 and then recognize the state of group A1. In this case, the second RSU (RSU 2) may perform the mode change step. The second RSU (RSU 2) may prepare for the departure of group B1 grouped in the negotiation step and allow group B1 to pass the road control section after a predetermined specific time (mode change time). Here, the specific time may be a time required from the start of the mode change step to the end of the mode change step. The mode change step may end when the passage of all vehicles included in the group A1 is detected based on the group information on group A1.

As described above, RSUs may control the flow of vehicles in each direction in the negotiation step. First, an RSU may inform corresponding vehicles of road traffic conditions (information on a road control section). Upon receiving the road traffic conditions, each vehicle may inform the RSU of a time when the vehicle starts waiting (or a time when the vehicle starts stopping). The RSU may collect the stopping time and group vehicles into a plurality of groups based on a flow control algorithm. Thereafter, when the entry into the road control section is allowed, the RSU may start vehicles for each group.

Figure 16:
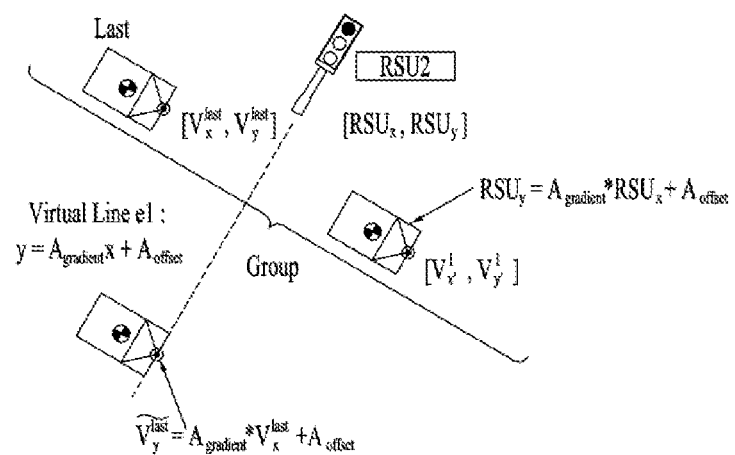
FIG. 16 is a diagram for explaining a method for an RSU to control driving of its group based on group information from another RSU.

FIG. 16 is a diagram for explaining a method for an RSU to control driving of its group based on group information from another RSU.

In the mode change step, the RSU may monitor the position of the last vehicle on a road control section in group information received from the other RSU based on its own location information and road information. In particular, the RSU may determine whether the last vehicle departs from the road control section based on a specific reference line.

Specifically, in the case of a north-south or east-west road, the RSU may determine whether the last vehicle departs from the control section based on a value on one coordinate axis (alternatively, one coordinate value of the vehicle position may have the same value as that of the RSU position). For example, in the case of an east-west road, the RSU may detect or determine whether the vehicle passes the control section (specific reference line or specific reference point) based on only a longitude value (x) on the longitude axis of the GPS location information about the vehicle. Alternatively, in the case of a north-south road, the RSU may determine whether the vehicle passes the control section (specific reference line or specific reference point) based on only a latitude value (y) on the latitude axis of the GPS location information.

Alternatively, if the road is neither in the north-south direction nor in the east-west direction (for example, if the direction of the road is from northwest to southeast or if the direction of the road has a specific slope with respect to north-south or east-west), the RSU may determine whether the last vehicle departs from the control section in consideration of both the latitude (y) and the longitude (x).

For example, the second RSU (RSU 2) may create a virtual line in a direction perpendicular to the inclined traveling direction of the road and determine whether the last vehicle passes the control section based on the values of $A_{gradient}$ and $A_{offset}$ related to the virtual line. Here, $A_{gradient}$ of the virtual line may be calculated based on the traveling direction of the road, and $A_{offset}$ of the virtual line may be determined based on the coordinate value of the second RSU (RSU 2). That is, the slope of the corresponding virtual line may be determined based on the traveling direction of the road, and the position of the RSU may be reflected in Equation 1 below to determine $A_{offset}$ that satisfies Equation 1. When the value of x at the vehicle position included in the received vehicle information is reflected in Equation 1 below based on the determined inclination and offset values, the value of Vy of the vehicle corresponding to the vehicle information may be calculated. The RSU may determine whether the vehicle departs from the virtual line by comparing the value of Vy with the actual y value corresponding to the vehicle. For example, referring to FIG. 16, when the vehicle is located on the left side of the virtual line, Vy may have a value located below the actual y value (or a value smaller than the actual y value). When the vehicle is located on the right side of the virtual line, Vy may have a value located above the actual y value (or a value greater than the actual y value).

$$y = A_{gradient} * x + A_{offset} \quad [\text{Equation 1}]$$

Figure 17:
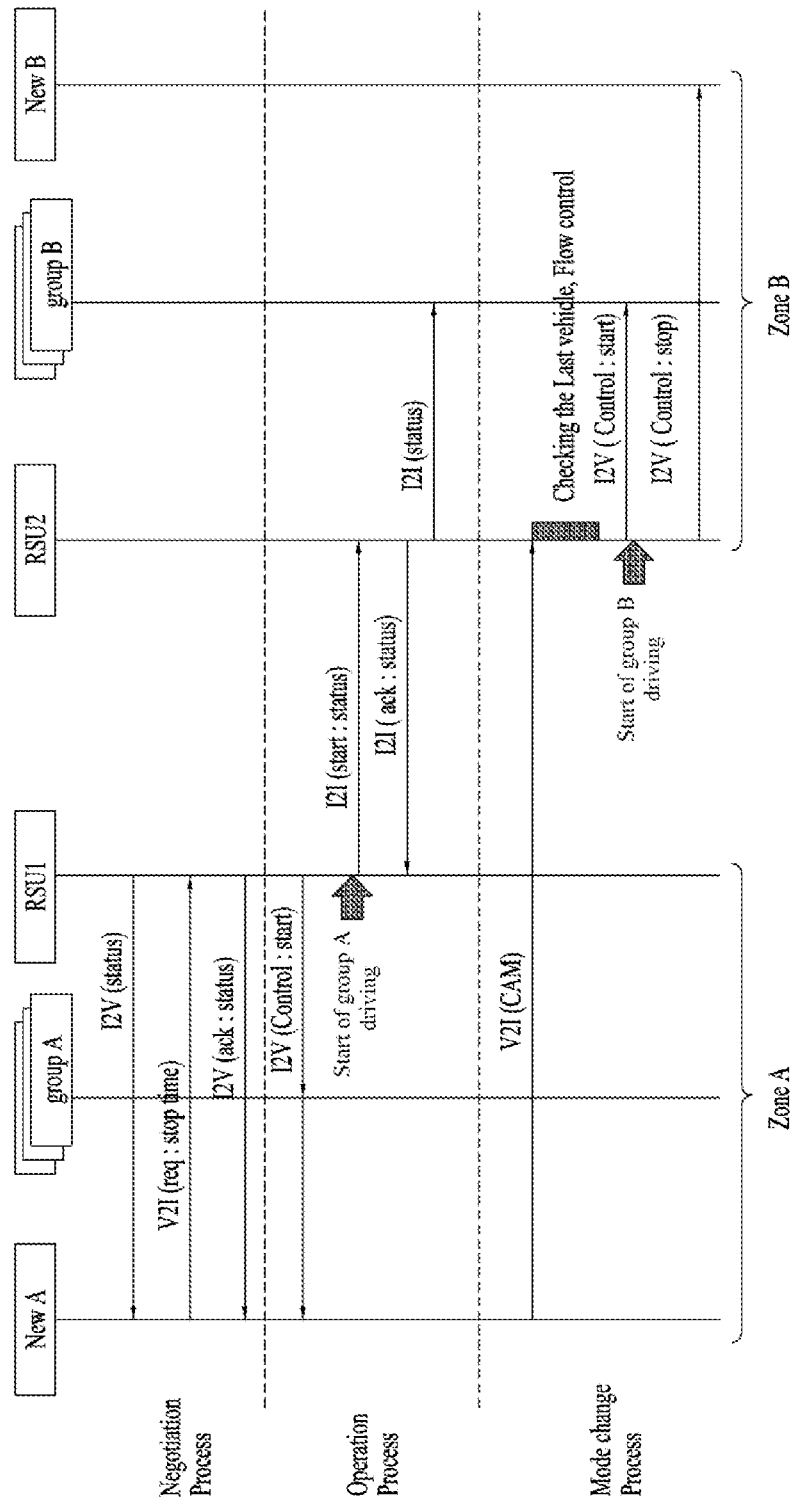
FIGS. 17 and 18 are diagrams for explaining a message exchange process between a first RSU, a second RSU, and/or vehicles.
Figure 18:
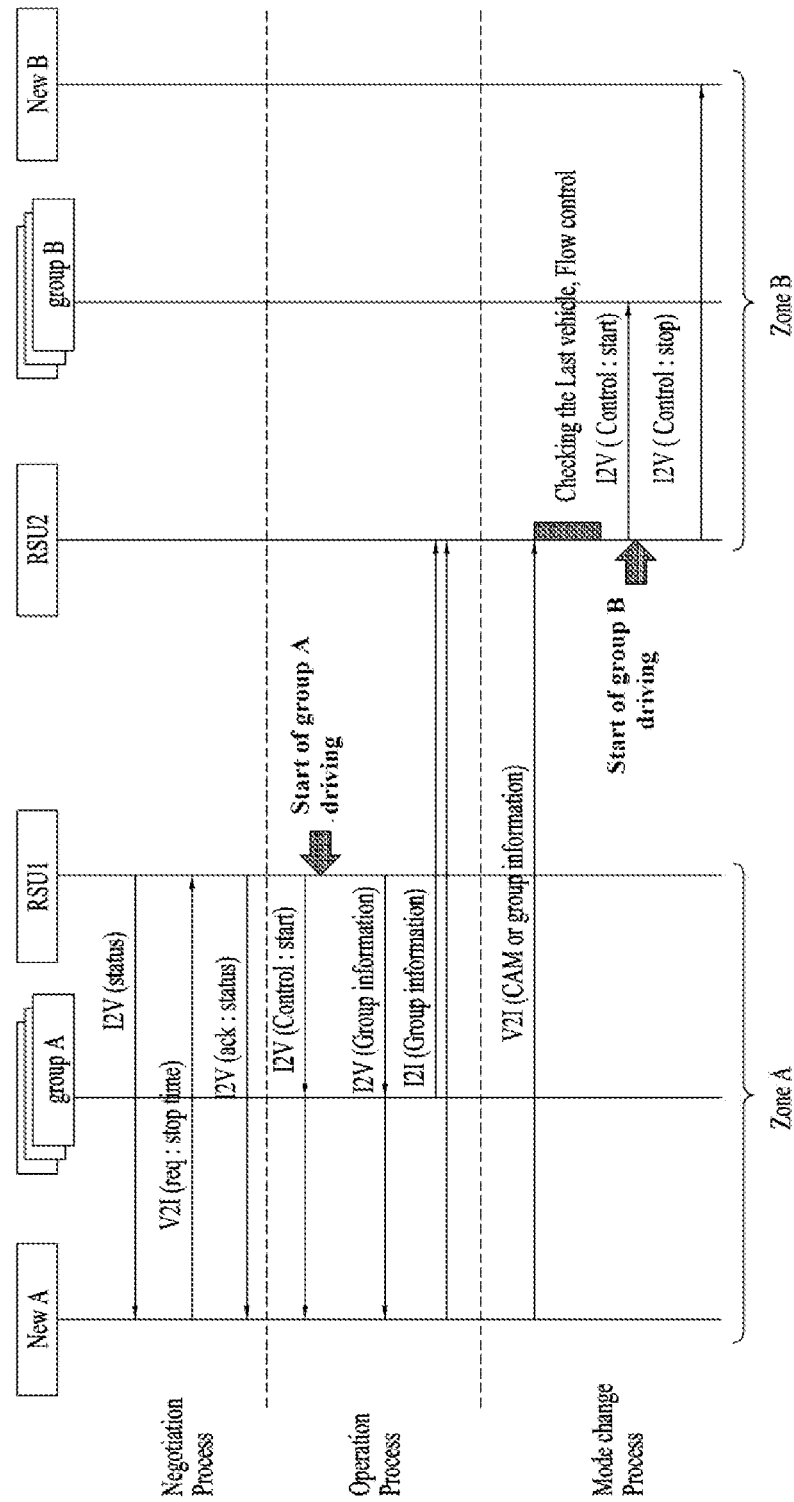

FIGS. 17 and 18 are diagrams for explaining a message exchange process between a first RSU, a second RSU, and/or vehicles.

Referring to FIG. 17, RSUs (RSU 1 and RSU 2) are installed at both ends of a road control section so as to be within coverage where the RSUs are capable of communicating with each other. In this case, the RSUs exchange messages (or message protocols) according to the flow illustrated in FIG. 17.

In the negotiation step, the RSU (RSU 1 or RSU 2) may periodically inform vehicles entering the road control section of a road restriction (and/or the road control section) and request the vehicles to stop. The RSUs (RSU 1 or RSU 2) may receive from the vehicles information about a stopping time (or stopping time point) according to the stop request. The RSU (RSU 1 or RSU 2) may classify the vehicles into a plurality of groups based on the received stopping time information (or update the groups). Alternatively, the RSU (RSU 1 or RSU 2) may provide information on an expected waiting time to the vehicles. In addition, the first RSU (RSU 1) may additionally incorporate a new vehicle A into group A by additionally considering the stopping time of the new vehicle A, which newly enters the road control section.

Then, when a group consists of vehicles greater than or equal to a predetermined minimum group size (or first threshold size), the first RSU (RSU 1) may transmit a signal allowing the entry into the road control section to the group. In this case, group A may start to enter the road control section. In addition, the first RSU (RSU 1) may provide group information on group A (information on each vehicle included in group A and/or information on the last driving vehicle of group A) to the second RSU (RSU 2) (based on I2I communication). The first RSU (RSU 1) may receive an acknowledgement (ACK) message from the second RSU (RSU 2). Based on the ACK, the first RSU (RSU 1) may recognize the waiting statuses of vehicles controlled by the second RSU (RSU 2) and adjust parameters related to group formation.

Next, the second RSU 2 (RSU 2) may receive V2X messages (e.g., CAM, BSM, or collective perception message (CPM)) from the vehicles included in group A. The second RSU 2 (RSU 2) may determine whether all vehicles included in group A pass the road control section (or whether the last driving vehicle of group A passes the road control section) based on analysis of the received V2X messages. When all the vehicles included in group A pass the road control section, the second RSU 2 (RSU 2) may transmit a signal indicating the entry into the road control section to group B consisting of a predetermined minimum number of vehicles. Meanwhile, the second RSU 2 (RSU 2) may transmit a stop signal to a new vehicle B, which does not belong to group B.

Referring to FIG. 18, RSUs (RSU 1 and RSU 2) may be out of each other's communication coverage. That is, I2I communication between the RSUs may be disabled. That is, when the first RSU (RSU 1) instructs group A formed in the negotiation step to enter a road control section in the operation step, the first RSU (RSU 1) may not provide information on group A to a second RSU (RSU 2), unlike that described in FIG. 16.

In this case, the RSUs (RSU 1 and RSU 2) may use a different protocol from that of FIG. 16. Specifically, the first RSU (RSU 1) may provide group information on group A to vehicles included in group A. Upon receiving the information on group A, the vehicles may periodically transmit group information on group A to provide the group information to the second RSU. The second RSU (RSU 2) may continue to monitor whether the last vehicle departs from the road control section by continuously collecting V2X messages (e.g., CAM, etc.) and/or the group information.

Figure 19:
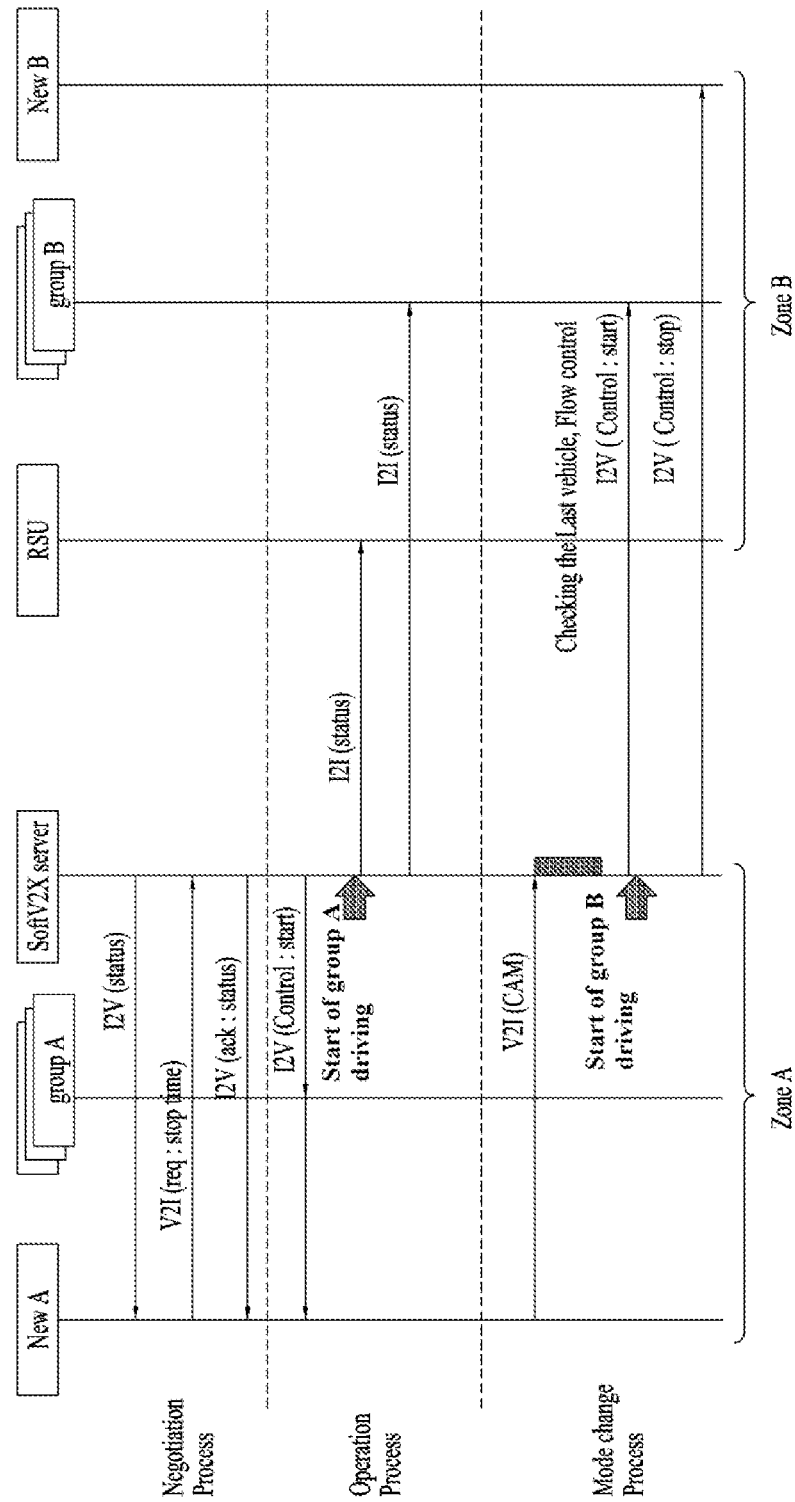
FIG. 19 is a diagram for explaining a method for a soft V2X server to control vehicles based on an RSU.

FIG. 19 is a diagram for explaining a method for a soft V2X server to control vehicles based on an RSU.

Referring to FIG. 19, the soft V2X server may collect information about V2X vehicles and/or transmit a driving control signal to the V2X vehicles based on the RSU. Here, the soft V2X server may generate a driving control signal while performing grouping in the negotiation step. In addition, the soft V2X server may generate a driving control signal during the operation step.

The soft V2X server may transmit information on a road control section to vehicles entering the road control section and transmit a signal requesting the vehicles to stop. The vehicles may report information on a stop time to the RSU (or soft V2X server) according to the request from the soft V2X server. The RSU (or soft V2X server) may group the vehicles based on the information on the stop time according to the above-described flow control algorithm and transmit an expected waiting time to each of the vehicles. Referring to FIG. 19, a new vehicle A may be included in group A. When group A is capable of entering the road control section, the soft V2X server may instruct the vehicles included in group A to enter the road control section, and the vehicles included in group A may start entering the road control section.

Thereafter, the RSU installed at the end of the road control section may receive status information about group A from the soft V2X server (or the RSU may receive group information on group A from the soft V2X server). The soft V2X server (or RSU) may receive V2X messages (e.g., CAM, BSM, or CPM) from the vehicles of group A. When it is determined based on analysis of the received V2X messages that the last vehicle of group A pass the restricted section, the soft V2X server (or RSU) may transmit a signal allowing the entry into the road control section to vehicles included in group B configured by the flow control algorithm.

According to another embodiment, an RSU may receive information about vehicles (first vehicles) entering a road control section from one end of the road control section from the first vehicles. The RSU may obtain information on vehicles (second vehicles) located at the other end of the road control section from a soft V2X server. In this case, the RSU may transmit information about the road control section and a signal related to stopping to the second vehicles via the soft V2X server. The RSU may receive information on stopping times of the first vehicles from the first vehicles and receive information on stopping times of the second vehicles from the soft V2X server. Thereafter, the RSU may perform grouping on the first vehicles and the second vehicles and update the groups according to the flow control algorithm.

The RSU may transmit information on an expected waiting time to each vehicle included in the groups formed by the grouping or group update. The RSU may group the second vehicles into group A and instruct group A to enter the road control section through the soft V2X server. The RSU may monitor V2X messages (e.g., CAM, BSM, or CPM) transmitted from group A and determine whether the last vehicle of group A is out of the road control section based on the received V2X messages. When it is determined that the last vehicle of group A leaves the road control section, the RSU may transmit an indication to enter the road control section to group B.

Alternatively, RSUs on both sides of a road control section and a soft V2X server may cooperate with each other to control the flow of vehicles in the road control section. Specifically, the RSU may transmit a first signal (or a signal including information on entry into the road control section and requesting to stop) through a V2X module, and the RSU may also transmit the first signal through the soft V2X server. In this case, among the vehicles, V2X vehicles may directly receive the first signal from the RSU, and soft V2X vehicles (a vehicle equipped with only a soft V2X module) may receive the first signal through the soft V2X server. Then, the RSU may receive a second signal (or a signal including information on a stopping time according to the first signal) from the V2X vehicle. The RSU may also obtain the second signal from the soft V2X server. The RSU may perform the above-described grouping procedure or negotiation procedure in consideration of both the second signal received from the V2X vehicle and the second signal received from the soft V2X server. Next, the RSU may transmit a V2X signal and a third signal (or a signal allowing the entry into the road control section) through the soft V2X server. In the mode change stage, the RSU may obtain information on vehicles from the other RSU in a V2X message or from the soft V2X server and then determine whether the vehicles are allowed to pass the road control section.

Figure 20:
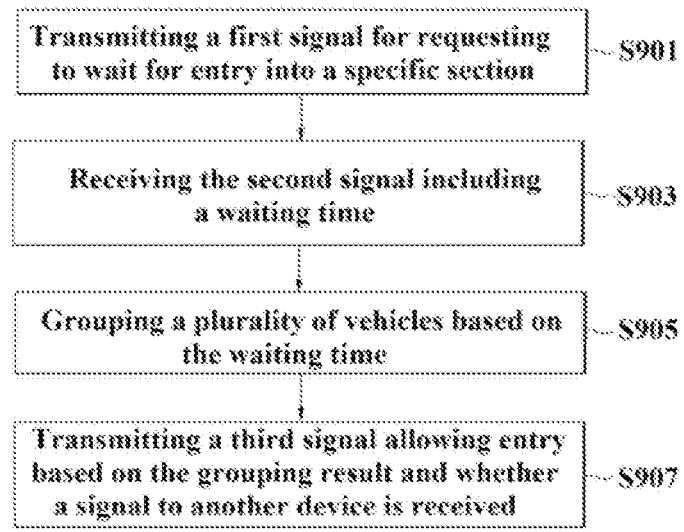
FIG. 20 is a flowchart illustrating a method for a first device to control driving of vehicles in a specific section.

FIG. 20 is a flowchart illustrating a method for a first device to control driving of vehicles in a specific section.

Here, as shown in FIG. 15, the first device may be a device for controlling driving of vehicles approaching (or entering) a road control section (specific section), where the flow is restricted, in a first direction. The first device may be a first RSU. The second device may be a device for controlling driving of vehicles approaching the road control section in a second direction opposite to the first direction. The second device may be a second RSU. In addition, the first RSU and the second RSU may exchange information on a group intending to enter the road control section through I2I communication. Alternatively, functions related to the second RSU may be performed by a soft V2X server performing soft V2X communication.

Referring to FIG. 20, the first device may periodically transmit a first signal requesting a plurality of vehicles approaching the specific section, i.e., the road control section, to wait for driving in the specific section (S901). The first signal may additionally include status information on the specific section i.e., the road control section as well as control information for requesting the waiting for driving. Here, the first signal may be a signal requesting to switch to a first driving mode, which is a standby state for entering the specific section.

Next, the first device may receive a second signal from each of the plurality of vehicles that receive the first signal (S903). The second signal transmitted from each vehicle may include information on a waiting time for which each vehicle waits for entry according to the first signal (or a time point at which each vehicle starts to stop in order to wait for the entry according to the waiting request). Alternatively, when the first signal is a signal requesting to switch the driving mode to the first driving mode, the waiting time may be a switching time at which the driving mode switches to the first driving mode.

Then, the first device may group the plurality of vehicles into at least one group based on the waiting time (S905). Here, the grouping refers to forming a group to enter the specific section. In particular, the first device may form a first group having a size greater than or equal to a predetermined threshold based on the grouping.

Specifically, the first device may determine or calculate a waiting time (total time from the waiting time to a specific time) for each vehicle based on the waiting time included in the second signal. The first device may classify the plurality of vehicles depending on whether the calculated waiting time for each vehicle exceeds a first threshold time (or predetermined threshold time). The first device may group vehicles having the waiting time greater than or equal to the first threshold time into a first group and group vehicles having the waiting time less than the first threshold time into a second group. Alternatively, when the first signal requests to switch the driving mode to the first driving mode, the waiting time may be a time for which the first driving mode is maintained after switching to the first driving mode. In this case, the first device may group the plurality of vehicles based on the mode maintaining time for which the first driving mode is maintained and the first threshold time Alternatively, when the first device does not receive the second signal any more for a predetermined period of time after receiving the second signal, the first device may decrease the first threshold time. In this case, when there is no vehicle approaching the specific section for a certain time after the grouping, the first device may increase the number of vehicles included in the first group by reducing the first threshold time.

The first device may transmit a third signal allowing the entry into the specific section based on the grouping result and depending on whether a signal including group information is received from the second device (S907). Alternatively, the third signal may be a signal requesting to switch to the second driving mode, which allows the entry to the specific section.

Specifically, the first device may determine whether to transmit the third signal based on the group size of the first group (where the group size refers to the number of vehicles included in the first group). For example, when the size of the first group is greater than or equal to a predetermined threshold size (or first threshold size), the first device may transmit the third signal to the vehicles included in the first group. In particular, the first device may transmit the third signal to the first group if a fourth signal including group information (e.g., group information on second vehicles attempting to enter the specific section in the second direction) is not received from the second device at a time when the first group having a group size greater than or equal to the predetermined threshold size is configured.

In other words, when the first group having a group size greater than or equal to the predetermined threshold size is formed, if the fourth signal is not received, the first device may transmit the third signal allowing the entry into the specific section to the first group. In this case, the first device may transmit group information on the first group to the second device in order to prevent other vehicles to enter the specific section in the second direction.

Alternatively, when the second signal includes information on a ratio of V2X vehicles to the plurality of vehicles, the first device may adjust the predetermined threshold size based on the information on the ratio. For example, if the ratio of surrounding V2X vehicles is less than a predetermined threshold ratio, the first vehicle may decrease the predetermined threshold size based on the information on the ratio. On the other hand, when the ratio of surrounding V2X vehicles is greater than or equal to the predetermined threshold ratio, the first vehicle may increase the predetermined threshold size based on the information on the ratio. That is, the first device may appropriately control the group size of the first group to enter the specific section by additionally reflecting the existence of non-V2X vehicles based on the information on the ratio. Alternatively, when the second signal includes information on the ratio of V2X vehicles to the plurality of vehicles, the first device may adjust the first threshold time based on the information on the ratio.

Alternatively, the first device may receive an ACK-related signal from the second device after transmitting group information on the first group to the second device. In this case, the first device may recognize that vehicles entering the specific section are present around the second device. In addition, the first device may recognize that a group formed by the second device is allowed to pass the specific section after the first group completely pass the specific section. The first device may receive the fourth signal including the group information from the second device and delay reconfiguration of the first group and/or transmission of the third signal until it is detected that vehicles corresponding to the group information included in the fourth signal depart from the specific section.

Alternatively, when the first device receives no ACK for the group information from the second device after transmission of the third signal (or when the first device receives a signal including information indicating that there are no vehicles controlled by the second device), the first device may group the remaining vehicles immediately after the first group enters the specific section. Specifically, after transmitting the third signal to the first group, the first device may form a new first group based on the waiting time of the remaining vehicles. When the size of the new first group is greater than or equal to the predetermined threshold size, the first device may transmit the third signal to the new first group.

On the other hand, when the first device receives the fourth signal at or before a time when the first device forms the first group greater than or equal to the predetermined threshold size, the first device may not transmit the third signal to the first group. That is, the first device may transmit a signal indicating the presence of the first group (i.e., ACK) to the second device without transmitting the third signal. The first device may allow the first group to pass the specific section on the next turn by transmitting the signal. In other words, by transmitting the signal, the first device may inform the second device that a group to enter the specific section is formed and request the second device to control the entry of the second vehicles into the specific section on the next turn.

When the first device receives the fourth signal at or before the time when the first device forms the first group greater than or equal to the predetermined threshold size, the first device may continuously monitor V2X messages transmitted by the second vehicles in the specific section based on the group information without transmitting the third signal. The first device may not transmit the third signal until it is detected by the monitoring that all of the second vehicles depart from the specific section.

Alternatively, the first device may recalculate the waiting time of each of the plurality of vehicles with respect to a departure time at which it is detected by the monitoring that all of the second vehicles depart from the specific section. The first device may regroup the plurality of vehicles based on the recalculated waiting time and transmit the third signal to the first group, which is formed by the regrouping. In this case, if the first group is regrouped based on the departure time by reception of the fourth signal, the group size of the first group may be limited to a predetermined maximum size (or second threshold size). The predetermined maximum size may be greater than the predetermined threshold size.

Alternatively, the first device may control signals of a traffic light. Specifically, when transmitting the first signal, the first device may transmit a control signal to the traffic light so as to change and/or maintain the signal of the traffic light to and/or as a stop request signal. For example, the first device may maintain or change the signal of the traffic light as or to the red light when transmitting the first signal. When transmitting the third signal, the first device may transmit a control signal for changing the signal of the traffic light to the green light. In this case, if the first device detects that the last V2X vehicle belonging to the first group enters the specific section, the first device may transmit a control signal requesting to change the signal of the traffic light back to the red light. By doing so, the first device may control the driving of nearby non-V2X vehicles according to the above-described embodiment.

Alternatively, when the first group having a group size greater than or equal to the predetermined threshold size is formed, the first device may provide the second device with information on the formation of the first group (the formation of the group and/or the time of the group formation). In this case, if the second device transmits a response signal, the first device may transmit the third signal to the first group. Alternatively, if the first device receives a signal including group information (the formation of a group and/or the time of the group formation) as a response signal from the second device, the first device may determine whether to transmit the third signal to the first group based on the group formation time according to the group information transmitted by the second device and the formation time of the first group. For example, when the group formation time according to the group information transmitted by the second device is earlier than the formation time of the first group, the first device may not transmit the third signal. On the other hand, when the formation time of the first group is earlier than the group formation time according to the group information transmitted by the second device, the first device may transmit the third signal to the first group. That is, when the first device and the second device shares groups capable of entering the specific section, the first device and the second device may determine a group that enters the specific section based on priorities by sharing the group formation times with each other.

As described above, the proposed disclosure proposes an RSU technology for increasing traffic flow in a road under road construction. That is, an RSU may measure the waiting time of vehicles based on interactive V2X communication between the vehicles and RSU and then provide fair opportunities to the vehicles. In addition, the RSU may not only communicate with a peer RSU based on I2I communication but also communicate with the entering vehicles based on V2I communication, thereby using the restricted road accurately and efficiently.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 21:
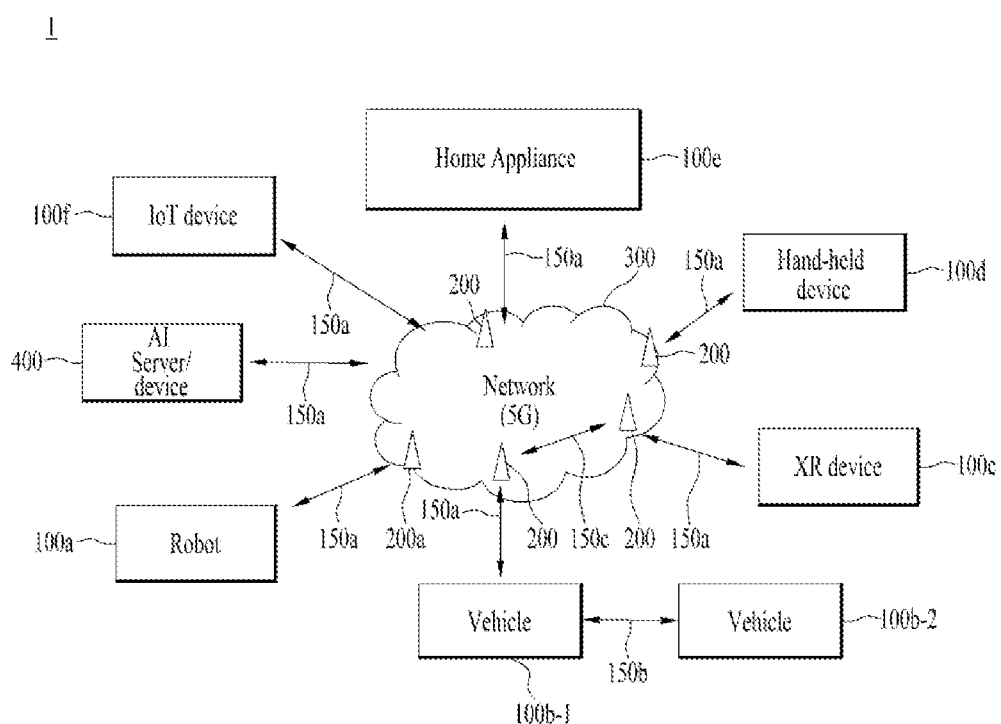
FIG. 21 illustrates a communication system applied to the present disclosure.

FIG. 21 illustrates a communication system applied to the present disclosure.

Referring to FIG. 21, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 22:
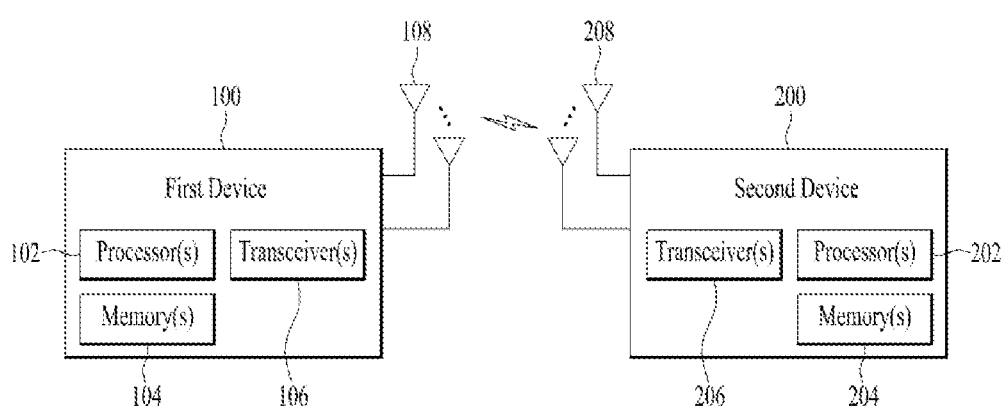
FIG. 22 illustrates wireless devices applicable to the present disclosure.

FIG. 22 illustrates a wireless device applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, a UE may include the processor(s) 102 connected to an RF transceiver and the memory(s) 104. The memory(s) 104 may include at least one program for performing the operations related to the embodiments described with reference to FIGS. 11 to 21.

The processor(s) 102 may be configured to: control the RF transceiver to transmit a first signal requesting to wait for entry into a specific section; receive a second signal from each of a plurality of vehicles in response to the first signal; group vehicles waiting to enter for more than a first threshold time among the plurality of vehicles into a first group based on information on an entry waiting time according to the first signal included in the second signal; and control the RF transceiver to transmit a third signal indicating the entry into the specific section based on the second signal. The third signal may be transmitted to the first group depending on whether a group size of the first group is greater than or equal to a first threshold size and whether group information is received from a second device. The processor(s) 102 may perform operations of controlling driving of vehicles in the specific section, which are described with reference to FIGS. 11 to 21, based on the program included in the memory(s) 104.

Alternatively, a chipset including the processor(s) 102 and the memory(s) 104 may be configured. In this case, the chipset may include: at least one processor; and at least one memory operably connected to the at least one processor and configured to, when executed, cause the at least one processor to perform operations. The operations may include: transmitting a first signal requesting to wait for entry into a specific section; receiving a second signal from each of a plurality of vehicles in response to the first signal; grouping vehicles waiting to enter for more than a first threshold time among the plurality of vehicles into a first group based on information on an entry waiting time according to the first signal included in the second signal; and transmitting a third signal indicating the entry into the specific section based on the second signal. The third signal may be transmitted to the first group depending on whether a group size of the first group is greater than or equal to a first threshold size and whether group information is received from a second device.

The processor(s) 102 may perform operations of controlling driving of vehicles in the specific section, which are described with reference to FIGS. 11 to 21, based on the program included in the memory(s) 104.

Alternatively, a computer-readable storage medium including at least one computer program that causes at least one processor to perform operations may be provided. The operations may include: transmitting a first signal requesting to wait for entry into a specific section; receiving a second signal from each of a plurality of vehicles in response to the first signal; grouping vehicles waiting to enter for more than a first threshold time among the plurality of vehicles into a first group based on information on an entry waiting time according to the first signal included in the second signal; and transmitting a third signal indicating the entry into the specific section based on the second signal. The third signal may be transmitted to the first group depending on whether a group size of the first group is greater than or equal to a first threshold size and whether group information is received from a second device. The processor(s) 102 may perform operations of controlling driving of vehicles in the specific section, which are described with reference to FIGS. 11 to 21, based on the program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 23:
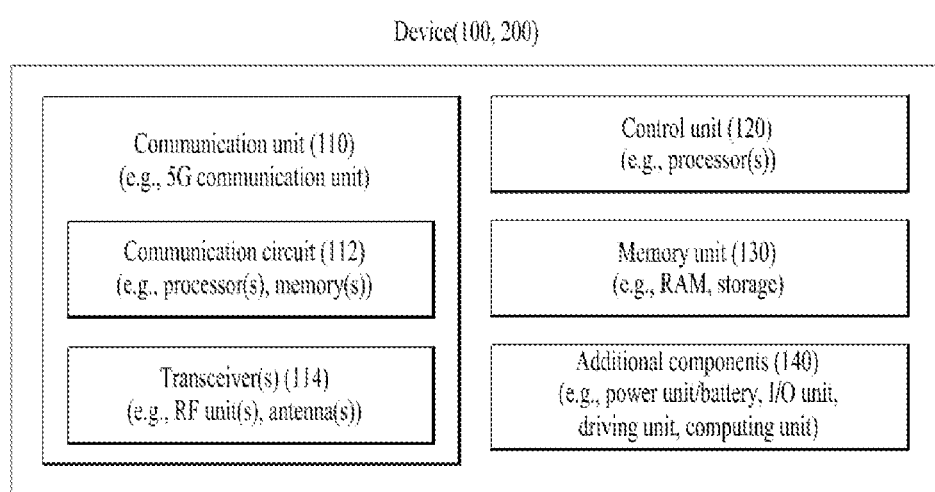
FIG. 23 illustrates another example of a wireless device to which the present disclosure is applied.

FIG. 23 illustrates another example of a wireless device applied to the present disclosure. The wireless device may be implemented in various forms according to a use-case/service (refer to FIG. 21)

Referring to FIG. 23, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 24:
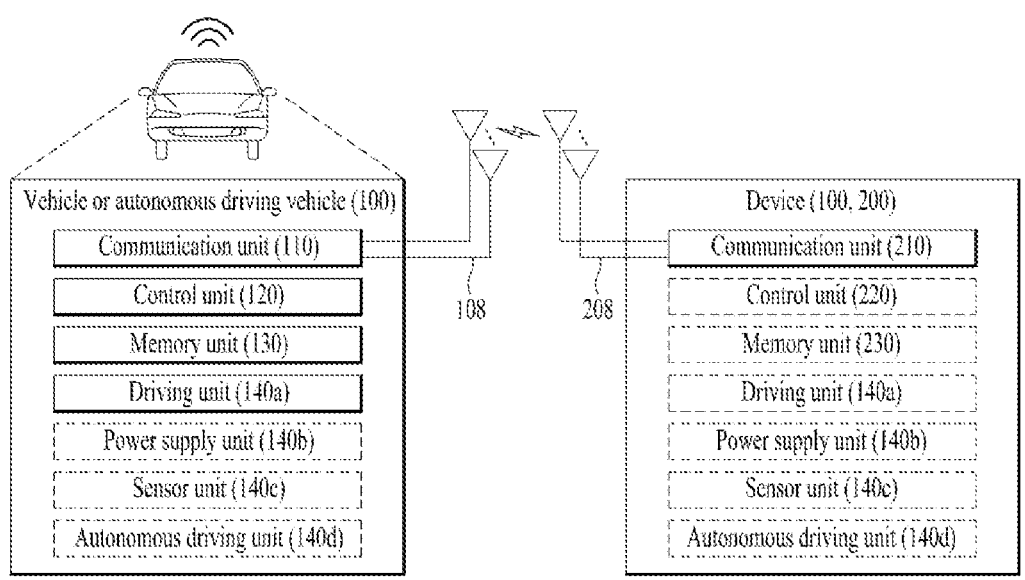
FIG. 24 illustrates a vehicle or an autonomous driving vehicle applied to the present disclosure.

Examples of Vehicles or Autonomous Vehicles to which the Present Disclosure is Applied FIG. 24 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 24, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method of transmitting a third signal that is a sidelink signal, by a first device, in a wireless communication system supporting sidelink, the method comprising:
receiving configuration information for the sidelink,
wherein the configuration information includes information on a resource pool for sidelink communication;
transmitting a control signal including resource allocation information to which a first signal is to be transmitted based on the configuration information;
transmitting the first signal to third devices related to a first zone based on the resource allocation information;
receiving a second signal from each of the third devices; and
transmitting the third signal including control information related to the first zone to at least one of the third devices based on the second signal,
wherein the first signal includes information for requesting entry into the first zone, and the second signal includes information on a waiting time for entry into the first zone,
wherein the first device groups devices waiting for more than a first threshold time among the third devices into a first group based on the waiting time, and wherein the first device transmits, to the first group, the third signal allowing entry into the first zone based on a group size of the first group that is equal to or greater than a first threshold size.

2. The method of claim 1, wherein before transmitting the third signal, the first device transmits group information on the first group to the second device to prevent other groups from entering the first zone.

3. The method of claim 1, wherein based on group information on a second group received from a second device, which is another device that controls the entry of the first zone, the transmission of the third signal to the first group having the group size greater than or equal to the first threshold size is stopped until the first timing, and
wherein the first timing is a timing at which all devices corresponding to the group information are detected to have moved out of the first zone.

4. The method of claim 3, wherein based on the reception of the group information, the first group is reconfigured based on a time at which all devices corresponding to the group information are detected to have moved out of the first zone.

5. The method of claim 4, wherein based on the reception of the group information, the group size of the reconfigured first group is limited to a second threshold size.

6. The method of claim 1, wherein the second signal further includes ratio information on a ratio of devices performing vehicle-to-everything (V2X) communication to the devices.

7. The method of claim 6, wherein the first threshold size is adjusted based on the ratio information.

8. A first device configured to transmit a third signal that is a sidelink signal in a wireless communication system supporting sidelink, the first device comprising:
a radio frequency (RF) transceiver; and
a processor connected to the RF transceiver, wherein the processor is configured to:

control the RF transceiver to receive configuration information for the sidelink, wherein the configuration information includes information on a resource pool for sidelink communication;

transmit a control signal including resource allocation information to which a first signal is to be transmitted based on the configuration information;

transmit the first signal to third devices related to a first zone based on the resource allocation information;

receive a second signal from each of the third devices; and transmit the third signal including control information related to the first zone to at least one of the third devices based on the second signal, wherein the first signal includes information for requesting entry into the first zone, and the second signal includes information on a waiting time for entry into the first zone, wherein the processor groups devices waiting for more than a first threshold time among the third devices into a first group based on the entry waiting time, and wherein the processor control the RF transceiver to transmit, to the first group, the third signal allowing entry into the first zone based on a group size of the first group that is equal to or greater than a first threshold size.

9. The first device of claim 8, wherein the second signal further includes ratio information on a ratio of devices performing vehicle-to-everything (V2X) communication to the devices.

10. The first device of claim 9, wherein the first threshold size is adjusted based on the ratio information.

11. A non-transitory computer-readable storage medium having at least one computer program configured to cause at least one processor to perform operations of transmitting a third signal that is a sidelink signal in a wireless communication system supporting sidelink, the computer-readable storage medium comprising: the at least one computer program configured to cause the at least one processor to perform the operations of controlling the driving of the vehicles in the first zone; and the computer-readable storage medium, wherein the operations comprise: receiving configuration information for the sidelink, wherein the configuration information includes information on a resource pool for sidelink communication; transmitting a control signal including resource allocation information to which a first signal is to be transmitted based on the configuration information; transmitting the first signal to third devices related to a first zone based on the resource allocation information; receiving a second signal from each of the third devices; and transmitting the third signal including control information related to the first zone to at least one of the third devices based on the second signal, wherein the first signal includes information for requesting entry into the first zone, and the second signal includes information on a waiting time for entry into the first zone, wherein the operation further includes grouping devices waiting for more than a first threshold time from among the third devices into a first group based on the waiting time, and transmitting to the first group the third signal allowing entry into the first zone based on a group size of the first group that is equal to or greater than a first threshold size.

* * * * *